Sept. 18, 1951 M. ARTZT 2,568,533

ELECTRONIC CIRCUIT ARRANGEMENT

Filed April 17, 1945 2 Sheets-Sheet 1

INVENTOR
MAURICE ARTZT
BY H. S. Grover
ATTORNEY

ELECTRONIC CIRCUIT ARRANGEMENT

INVENTOR
MAURICE ARTZT
BY H. S. Grover
ATTORNEY

Patented Sept. 18, 1951

2,568,533

UNITED STATES PATENT OFFICE 2,568,533

ELECTRONIC CIRCUIT ARRANGEMENT

Maurice Artzt, Princeton, N. J., assignor to Radio Corporation of America, a corporation of Delaware Application April 17, 1945, Serial No. 588,757

15 Claims. (Cl. 250—36)

This invention relates to an electronic circuit arrangement and more particularly to an electron tube circuit having for its object to provide substantial freedom from the adverse effects upon its amplification characteristics of variations in the applied direct current potential for operating the same.

In various applications of tube circuits, some of which will be hereinafter mentioned, it has been a problem to provide means for nullifying the effect of changes in the tube constants and to provide easily controlled means for maintaining the tube constants at desired values. This is particularly true where it becomes necessary to operate a device so as to exhibit a negative resistance and also in order to maintain optimum efficiency, say in an RC oscillator. In another application of my invention the problem which is solved is that of maintaining a constant current or a negative resistance in an amplifier system.

I have found that by the use of two triode discharge tubes properly interconnected a negative resistance characteristic may be exhibited or the system may be adjusted to provide an equivalent internal resistance of infinity so as to form a "perfect pentode" constant current system.

Figure 4:
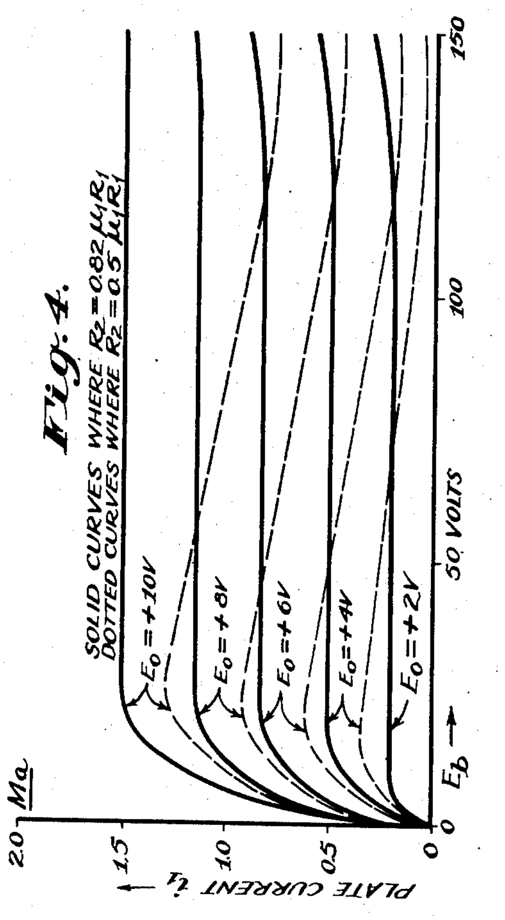
Figure 3:
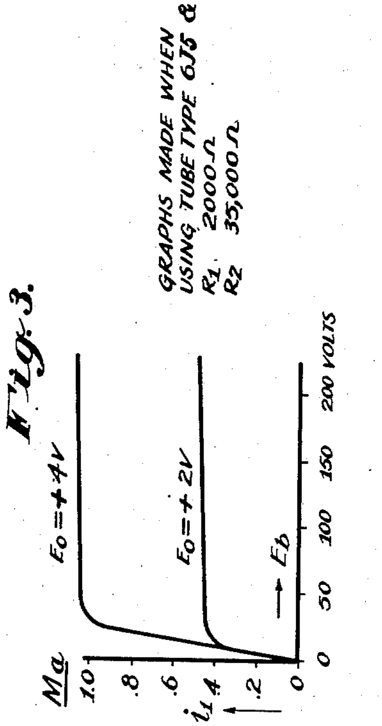
Figure 1:
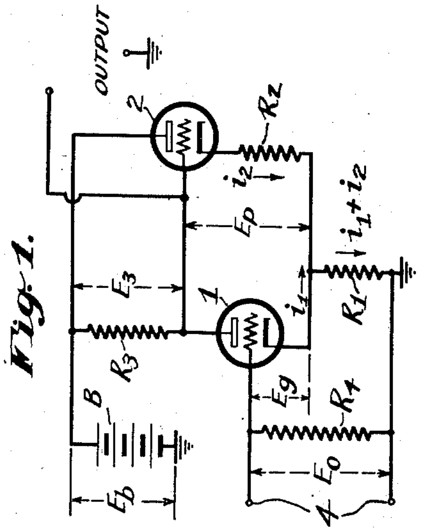
Figure 2:
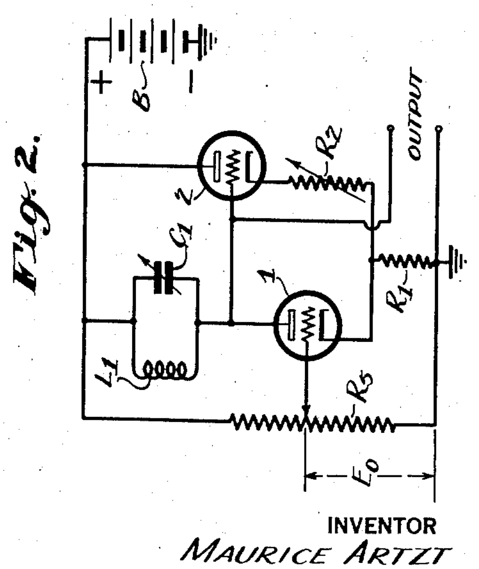
Figure 5:
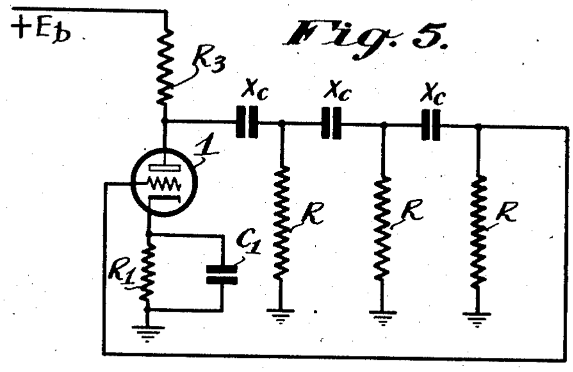
Figure 6:
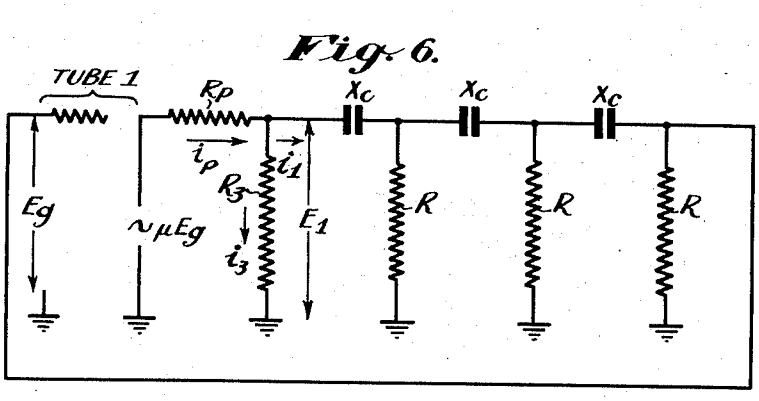
Figure 7:
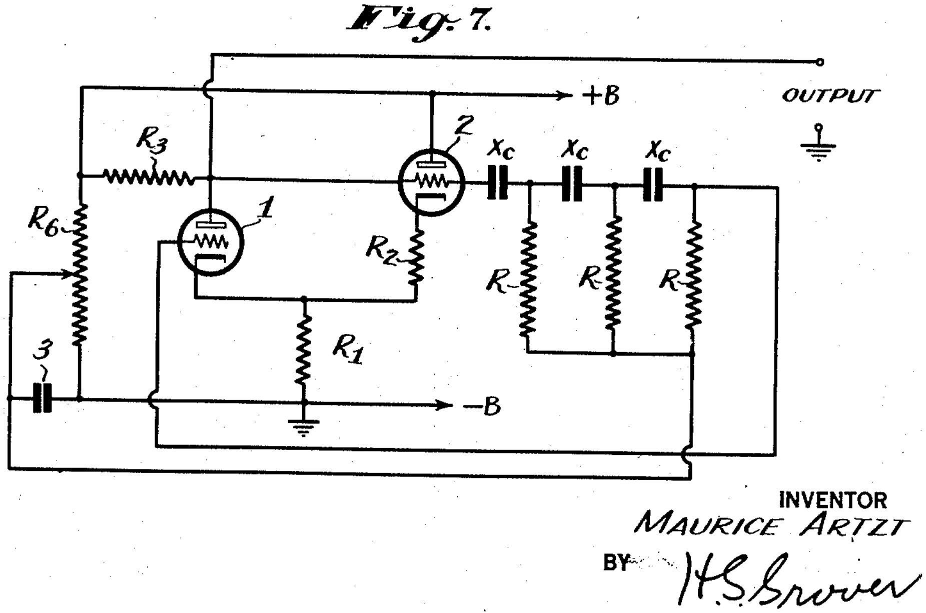

My invention will now be described in more detail, reference being made to the accompanying drawing in which Fig. 1 shows a circuit arrangement for two triode discharge tubes which are jointly operable to obtain the effects of a pentode discharge tube, Fig. 2 shows a modification of the circuit arrangement of Fig. 1 which is capable of operation as a regenerative oscillator, Fig. 3 is a chart the curves on which indicate the relation between direct current source voltages and output current in an amplifier as related to certain input potentials, Fig. 4 shows another chart where operation of the circuit arrangement of my invention is compared under conditions of simple amplification versus negative resistance effects, Figs. 5 and 6 are diagrams of phase shifting networks to which reference is made in discussing the mathematical aspects of my invention, and Fig. 7 shows the application of my invention to an RC-oscillator having a phase shifting network for applying feedback potentials from the second to the first tube.

Referring first to Fig. 1, I show therein a triode discharge tube 1 having its anode potential supplied from a battery B through a resistor $R_3$. The cathode of tube 1 is connected to the grounded negative terminal of the source B through a resistor $R_1$. The control grid of tube 1 is connected to ground through a resistor $R_4$. Input terminals are indicated at points 4, one of which is connected directly to the control grid in tube 1 and the other is grounded.

A second triode discharge tube 2 is shown having its anode directly connected to the positive terminal of the source B while the cathode is connected through a resistor $R_2$ to the cathode of tube 1. The control grid in tube 2 is directly connected to the anode in tube 1. This grid-anode connection is of the essence of the invention when considered in combination with other important factors entering into the design of a circuit.

In order to present a mathematical basis for the favorable characteristics of the circuit arrangement shown in Fig. 1 and in order to clarify this mathematical discussion I have indicated in the diagram certain potentials and current values across different portions of the circuit as follows: $E_0$ represents the input potential applied between ground and the control grid of tube 1. $E_p$ represents the voltage drop between cathode and anode of tube 1. $E_3$ represents the voltage drop through resistor $R_3$. $i_1$ represents the current flowing through tube 1. $i_2$ represents the current flowing through tube 2. Obviously the current flowing through resistor $R_2$ is $i_2$ alone, whereas the current flowing through resistor $R_1$ is the sum of $i_1+i_2$. $E_g$ represents the grid bias in tube 1. The potential $E_b$ of the source B is equal to $R_1(i_1+i_2)+E_p+E_3$. Looking at the input circuit, it is also clear that $E_g=E_0-(i_1+i_2)R_1$.

It will now be shown that under certain conditions which are readily available upon suitable choice of values for the circuit components the current $i_1$ can be made independent of the source voltage $E_b$ within a certain practical range of values.

If tube 1 has an amplification factor $\mu_1$ and a plate resistance $R_{p_1}$ then the voltage $E_p$ may be expressed thus:

$$E_p=i_1Rp_1-\mu_1E_g \quad (1)$$

Now substituting the value of $E_g$ as above given:

$$E_p=i_1(R_{p_1}+\mu_1R_1)+i_2\mu_1R_1-\mu_1E_0 \quad (2)$$

When $R_2$ is of high value the tube 2 becomes a cathode follower and the voltage drop across $R_2$ approaches $E_p$ and $E_p\cong i_2R_2$ or, approximately, $$i_2=\frac{E_p}{R_2} \quad (3)$$

Now substituting (3) in (2):

$$E_p=i_1(Rp_1+\mu_1R_1)+\frac{E_p\mu_1R_1}{R_2}-\mu_1E_0 \quad (4)$$

In the special case were $R_2=\mu_1 R_1$ $$i_1=\frac{\mu_1 E_0}{Rp_1+\mu_1 R_1} \qquad (5)$$

Here the expression containing $E_p$ cancel out and show the value of the current through the tube 1 to be independent of the source voltage applied to the anode.

Thus, over the limits for which the initial assumption holds (Equation 1) the output current is dependent on the input potentiol $E_0$ but not on the applied anode potential. This pre-supposes perfect cathode follower action in tube 2. In practice to overcome the imperfact action of tube 2 as a cathode follower, the resistor $R_2$ must be made slightly smaller than $\mu_1 R_1$ in order to give constant current action.

In an experimental setup of this circuit using two type 6J5 tubes for tubes 1 and 2, and with a resistance value of 2000 ohms for resistor $R_1$, $R_2$ being of a value of 35,000 ohms, it was found that the input potential $E_0$ could be varied from 0 to +4 volts and $R_3$ could be varied from 0 to 100,000 ohms with the source B having a nominal value of 150 bolts, and the current $i$ (at any set value of $E_0$) would not appreciably vary with variations in $R_3$ or $E_b$. In other words, the value of $i_1$ was found to be wholly dependent upon the value of $E_0$ and wholly independent of anode supply voltage over very wide limits. Thus the tube circuit in effect constituted a "perfect pentode." Experimental curves for this setup are shown in Fig. 3. Note that for source potentials above 50 volts the values of $i_1$ in milliamperes are shown by substantially horizontal lines, although admittedly they begin to slope very gently upwards at the larger values of potential $E_b$. Two curves are shown by way of illustration, one where $E_0=+2$ volts and the other where $E_0=+4$ volts.

In order to operate the circuit of Fig. 1 with a negative resistance characteristic the resistor $R_2$ in the cathode circuit of tube 2 is preferably made considerably less than $\mu_1 R_1$. Two sets of experimental curves were obtained while using 6J5 tubes with $R_1$ equal to 5,000 ohms. The solid line curves indicate constant current conditions with $R_2$ having a value of 82,000 ohms, while the broken line curves exhibit a negative resistance characteristic, with the value of the resistor $R_2$ chosen as 50,000 ohms.

In view of Fig. 4 it will be realized that the amount of negative resistance can be controlled over a wide range by varying the value of resistor $R_2$. The principles of operation of the circuit shown in Fig. 1 as set forth hereinabove lead to many useful applications either where a constant current characteristic is desired or where a negative resistance characteristic is wanted. In either case the performance is greatly improved as compared with circuit arrangements heretofore known.

One very practical use of a circuit arrangement having a negative resistance characteristic is to be found in the design of an oscillation generator. Fig. 2 shows such a circuit.

In Fig. 2 the tubes 1 and 2 are interconnected in the same manner as shown in Fig. 1. In place of the resistor $R_3$, however, Fig. 2 shows a tank circuit composed of an inductance $L_1$ in parallel with a capacitor $C_1$. If desired, the capacitor $C_1$ may be made variable.

The resistors $R_1$ and $R_2$ occupy the same positions in Fig. 2 as shown in Fig. 1. The control grid in tube 1 is connected to a movable tap on potentiometer $R_5$ which is connected across the terminals of the source B. Between the potential tap and ground a potential drop $E_0$ is indicated. The grid bias applied to tube 1 is the difference between the potential drop $E_0$ and the potential drop $R_1(i_1+i_2)$.

In the operation of the oscillator shown in Fig. 2 certain characteristics are exhibited which are similar to those of the well known dynatron oscillator, but in the instant case there is the advantage that the amount of negative resistance introduced may easily be controlled by varying the value of resistor $R_2$ or by varying the position of the tap on the potentiometer $R_5$. These adjustments permit the value of negative resistance necessary for oscillation to be definitely fixed instead of relying on "dynatron" action wherein the negative ressitance is produced by secondary emission.

As shown in Fig. 7 my invention is also applicable to the design of an RC-oscillator of the phase shift type. Referring to Fig. 7 I show tubes 1 and 2 interconnected in the same manner as indicated in Fig. 1. Resistors $R_1$ and $R_2$ also occupy the same positions as before. Potentiometer $R_6$ has its movable tap connected to the junction points of three resistors R which constitute parallel impedances in a phase shift network, the other components of which are represented by three series-connected capacitors $X_c$. The input end of the phase shifting network is connected to the grid in tube 2 and also to the anode in tube 1. The grid in tube 1 is connected to the junction between the capacitor $X_c$ and resistor R at the output extremity of the phase shifting network. Capacitor 3 is preferably employed to obtain an A. C. ground potential at the potentiometer tap and at the mutual junction points of the resistors R. The purpose of the potentiometer tap is to set the correct D. C. bias on the grid of tube 1.

Output terminals are shown in each of the circuits of Figs. 1, 2 and 7. One of these terminals is connected to the anode of tube 1; the other output terminal is grounded. In applications where the presence of the anode potential $E_b$ in output circuit would be undesirable a blocking condenser may be inserted in output lead between the terminal and the plate of tube 1. It will be understood by those skilled in the art that the loading of an oscillator circuit for purposes of utilization is preferably kept at a relatively low value in order not to impair the stability. Thus, if the output were to be fed to the grid of another tube, no detrimental results will follow.

Referring to Fig. 5 which shows a prior art type of phase shift oscillator, it is generally assumed that the network of resistors and capacitors shifts the phase by 180° at the generated frequency, and the tube 1 by another 180° to complete the 360° necessary for oscillation. But this is only approximately true. If, therefore, it is desired to build a very stable oscillator, account must be taken of the fact that the tube does not shift phase exactly 180° between grid and plate because of its internal plate resistance. This can be shown more readily by referring to Fig. 6 which is the equivalent electrical circuit of the oscillator in Fig. 5. In order to generate oscillations $E_g$ and $\mu E_g$ must be 180° out of phase. Hence, resistors $R_3$ and $R_p$ with their currents $i_3$ and $i_p$ must be considered as a part of the network in deriving an expression for overall phase shift.

For the network shown, consisting of three capacitors with reactance $X_c$ and three resistors R, connected in a so-called "ladder" network it can be easily shown that the following voltage and current formulas apply, the symbol $j$ denoting $\sqrt{-1}$:

$$\frac{E_1}{E_g}=\frac{[R^3-5RX_c^2-j6R^2X_c+jX_c^3]}{R_3} \quad (6)$$

and $$i_1=\frac{E_g[3R^2-X_c^2-j4RX_c]}{R^3} \quad (7)$$

In the ideal case, if the tube resistance $R_p$ were zero, the two voltages $\mu E_g$ and $E_1$ in Fig. 6 would be in phase. The tube would then have exactly 180° phase shift, and the remaining 180° would be in the network and would be according to Formula 6. Here, for 180° phase shift, the $j$ terms must cancel, and this occurs where $X_c^2=6R^2$. The frequency of oscillation will then be $$f=\frac{1}{\sqrt{6}\ 2\pi RC} \quad (8)$$

With $R_p$ finite in value the frequency of oscillation will be lower than in Formula 8. To find this effect:

$$i_p=i_1+i_3$$
$$=\frac{i_1R_3+E_1}{R^3} \quad (9)$$

Also $$\mu E_g=i_pR_p+E_1$$
$$=\left[\frac{i_1R_3+E_1}{R^3}\right]R_p+E_1 \quad (10)$$

Substituting in (10) the values for $E_1$ and $i_1$ in (6) and (7):

$$E_g=\frac{E_gR_p[3R^2-X_c^2-j4RX_c]}{R^3}+\frac{E_g[R_p+R_3]}{R^3}\left\{\frac{R^3-5RX_c^2-j6R^2X_c-jX_c^3}{R^3}\right\} \quad (11)$$

At the frequency of oscillation, $\mu E_g$ and $E_g$ will be 180° out of phase, and the $j$ terms must cancel. Therefore $$R_p[6R^2+4RR_3]+6R^2R_3=R_3X_c^2+R_3X_c^2 \quad (12)$$

And from (12), if $$X_c=\frac{1}{2\pi fC}$$

$$f=\frac{\sqrt{R_p+R_3}}{2\pi C\sqrt{R_p(6R^2+4RR_3)+6R^2R_3}} \quad (13)$$

Thus it can be seen that in the prior art phase shift oscillators the value of $R_p$ has a very definite effect on phase shift of the tube and network, and any variation in $R_p$ with filament temperature or plate voltage will cause a drift in frequency.

In addition to the first ideal case where $R_p$ must be zero for eliminating its effect on frequency, another ideal condition is obtained if $R_p$ is infinite. While the first case can never be realized, the second case with infinite $R_p$ can be obtained with the new circuit. With $R_p=\infty$, the formula for $i_p$ to drive the network and load resistor $R_3$ in expression (9) becomes equal to the formula for $i_1$ in (5).

Thus:

$$\frac{\mu_1E_g}{R_{p_1}+\mu_1R_1}=\frac{i_1R_3+E_1}{R^3} \quad (14)$$

Again substituting for $i_1$ and $E_1$ their values in (6) and (7) and simplifying:

$$\frac{\mu_1E_g}{E_g}=\frac{[R_{p_1}+\mu_1R_1]}{R_3}\left[\frac{R_3(3R^2-X_c^2-j4RX_c)+R^3-5RX_c^2-j6R^2X_c+jX_c^3}{R^3}\right. \quad (15)$$

The condition for 180° phase shift is again where $j$ terms cancel: Thus $$X_c^3=6R^2X_c+4R_3RX_c$$

or $$X_c^2=6R^2+4R_3R \quad (16)$$

And the frequency becomes $$F=\frac{1}{2\pi C\sqrt{6R^2+4R_3R}} \quad (17)$$

It can be seen that $R_p$ does not appear in this formula for frequency.

Although $R_3$ can affect frequency and amplification, it can be fixed just as any of the network resistors, but $R_p$ which cannot be fixed in value, has now been removed from a position where it can affect the frequency of oscillation. Frequency stability has been greatly improved over that given by the usual circuit in Fig. 5.

The final circuit diagam of this combination will then be as in Fig. 7. The ladder network in this figure is the same as that described above with reference to Fig. 5. It should be noted that while it is necessary to bypass $R_1$ in Figure 5 with the capacitor $C_1$ to reduce the degeneration of $R_1$ and allow oscillation, no such bypass capacitor can be used in the circuits in Figures 1, 2 and 7, or the beneficial effects of the second tube 2 will be destroyed.

As an example, an oscillator of the type shown in Fig. 5 was designed for 60 cycles using one of the triodes in a 6SL7-GT tube for 1. After proper adjusting, the best stability obtained was approximately 1% change in frequency for a 20% change in the 115 volt 60-cycle supply line from which both filament and plate supplies were obtained. When the second triode 2 of the same tube 6SL7-GT was connected into the circuit of Fig. 7 and $R_2$ properly adjusted, the frequency drift was brought down to less than 0.05% for the same supply voltage change, an improvement in stability of approximately 20 to 1.

To those skilled in the art modifications of my invention other than as herein shown and described will be apparent.

What I claim is:

1. A circuit arrangement including a triode discharge tube for generating oscillations, said arrangement comprising a direct current source, a phase shifting circuit connected between the control grid and the anode of said tube, a resistor connected between the cathode of said tube and the negative terminal of said source, a potentiometer connected across the terminals of said source and having an adjustable tap resistively connected to the control grid of said tube, and means including a controllable impedance connected in parallel between the positive terminal of said source and the junction between said cathode and said resistor for producing a negative resistance characteristic in said tube, said impedance including the space path of a triode discharge tube the control grid of which is directly connected to the anode of the first said tube.

2. A circuit arrangement for generating oscillations including a first triode discharge tube and a second triode discharge tube, said arrangement including a direct current power supply having circuit connections to the cathodes and anodes of said tubes for activating the same, a phase shifting network connected between the anode and control grid of the first tube, a direct connection between the anode of the first tube and the control grid of the second tube, a resistor interconnecting the anodes and another resistor interconnecting the cathodes of said tubes, the connections and interconnections being such that the second tube operates as a cathode follower with respect to the first tube, an impedance connected between the cathode of the first tube and the negative terminal of said source, and an adjustable grid biasing circuit for the grid of the first tube, this circuit including a potentiometer connected across the terminals of said power supply and having a movable tap connected to the control grid of the first tube.

3. In an electronic circuit arrangement, a first discharge device and a second discharge device, each device including a cathode, an anode and at least one grid, a direct current power supply connected in circuit with said devices for actuating the same, anode and cathode circuit impedances in the power supply connections, a direct connection between the anode of the first device and the grid of the second device, and a resistor interconnecting the cathodes of the two devices, the ohmic value of the last said resistor being so chosen in relation to the impedance of the aforementioned cathode circuit impedance that together they constitute means for minimizing variations in the amplification factor of said circuit due to variations in the voltage of said power supply and a phase shifting network connected between the anode and control grid of said first discharge device, said network being operable as a feedback circuit for causing oscillations to be generated.

4. In an electronic circuit arrangement, a first discharge device and a second discharge device, each device including a cathode, an anode and at least one grid, a direct current power supply connected in circuit with said devices for actuating the same, anode and cathode circuit impedances in the power supply connections, a direct connection between the anode of the first device and the grid of the second device, and a resistor interconnecting the cathodes of the two devices, the ohmic value of the last said resistor being so chosen in relation to the impedance of the aforementioned cathode circuit impedance that together they constitute means for minimizing variations in the amplification factor of said circuit due to variations in the voltage of said power supply, said arrangement being characterized in that the anode circuit impedance of said first discharge device is constituted as a parallel resonant circuit for causing oscillations to be generated.

5. In an oscillation generator, a triode tube, circuits for operating said tube in such a manner that its output current is dependent primarily on input voltage and independent of anode potential variations including a source of direct current potential having a positive terminal connected to the anode of said tube and a negative terminal connected by a resistor to the cathode of said tube, a biasing circuit for said grid of the tube including a resistor connecting the grid of the tube to the negative terminal of said source, an input circuit coupled with the control grid of the tube, an output circuit coupled to the anode of the tube, means for establishing positive feedback in said first tube including a second tube having electrodes including at least an anode, a control grid and cathode, a direct connection between the anode of the first tube and control grid of the second tube, a resistor connected between the cathodes of the tubes, a connection between the anode of the second tube and a positive terminal of said source, the values of said first named and last named resistors being chosen so that $R_2$ is equal to or less than $\mu_1 R_1$ where $R_2$ is the last named resistor; $R_1$ is the first named resistor and $\mu_1$ is the gain of the first tube and a voltage phase shifting network coupling the anode of the first tube to the control grid of the first tube.

6. An electronic circuit arrangement including a tube having a control grid, an anode and a cathode, an impedance element having one terminal thereof connected to the anode of said tube, a resistor having one terminal thereof connected to the cathode of said tube, a source of direct operating potential having the positive terminal thereof connected to another terminal of said impedance element and the negative terminal thereof connected to another terminal of said resistor, a biasing circuit for the grid of said tube including at least one resistor connecting the grid of said tube to the negative terminal of said source, and a cathode follower circuit coupled across said first tube, said cathode follower circuit including a second tube having an anode, a control grid and a cathode, a direct connection between the anode of the first tube and control grid of the second tube, an unbypassed resistor connected between the cathodes of the tubes and a connection between the anode of the second tube and a positive terminal of said source, the ratio of resistance values of said second resistor to that of the first said resistor being less than the amplification factor of the first said tube whereby the output current of said electronic circuit arrangement is dependent primarily on input voltage and independent of operating potential variations.

7. An electronic circuit arrangement including a tube having a control grid, an anode and a cathode, a series impedance element having one terminal thereof connected to the anode of said tube, a series resistor having one terminal thereof connected to the cathode of said tube, a source of direct operating potential having the positive terminal thereof connected to another terminal of said series impedance element and the negative terminal thereof connected to another terminal of said series resistor, a biasing circuit for the grid of said tube including a resistor connecting the grid of said tube to the negative terminal of said source, an output circuit coupled to the anode of said tube, and a cathode follower circuit coupled across said first tube, said cathode follower circuit including a second tube having an anode, a control grid and a cathode, a direct connection between the anode of the first tube and control grid of the second tube, a further resistor connected between the cathodes of the tubes and a connection between the anode of the second tube and a positive terminal of said source, said further resistor having a value not greater than the value of said series resistor multiplied by the gain factor of said first tube to render the output current of said electronic circuit arrangement dependent primarily on input voltage and independent of operating potential variations.

8. An oscillation generator including a triode tube having an anode, a control grid and a cathode, a source of direct operating potential having a positive terminal connected to a terminal of an impedance element and a negative terminal connected to a terminal of a series resistor, the remaining terminals of said impedance element and said resistor being connected to the anode and cathode respectively of said tube, a biasing circuit for the grid of the tube including a resistor connecting the grid of the tube to the negative terminal of said source, an input circuit coupled to the control grid of the tube, on output circuit coupled to the anode of the tube, and a cathode follower circuit coupled across said first tube, said cathode follower circuit including a second tube having an anode, a control grid and a cathode, a direct connection between the anode of the first tube and control grid of the second tube, a further resistor connected between the cothodes of the tubes and a connection between the anode of the second tube and a positive terminal of said source, said further resistor having a value not greater than the value of said series resistor multiplied by the gain factor of said triode tube, to render the output current of the generator independent of operating potential variations, and a frequency determining circuit interposed in the circuit of and coupled to the anode of said triode tube to determine the frequency of the oscillation produced.

9. A direct current amplifier arrangement including a tube having a control grid, an anode and a cathode, a series impedance element having one terminal thereof connected to the anode of said tube, a series resistor having one terminal thereof connected to the cathode of said tube, a source of direct operating potential having the positive terminal thereof connected to another terminal of said impedance element and the negative terminal thereof connected to another terminal of said series resistor, a biasing circuit for the grid of said tube including at least one resistor connecting the grid of said tube to the negative terminal of said source, means to apply direct currents to be amplified to the control grid of said tube, an output circuit coupled to the anode of said tube, and a cathode follower circuit coupled across said first tube, said cathode follower circuit including a second tube having an anode, a control grid and a cathode, a direct connection between the anode of the first tube and control grid of the second tube, a further resistor connected between the cathodes of the tubes a connection between the anode of the second tube and a positive terminal of said source, said further resistor having a value substantially equal to the value of said series resistor multiplied by the gain factor of said first tube to render the output current of said amplifier arrangement dependent primarily on the applied currents and independent of operating potential variations.

10. An amplifier circuit arrangement including a tube having a control grid, an anode and a cathode, an impedance element having one terminal thereof connected to the anode of said tube, a series resistor having one terminal thereof connected to the cathode of said tube, a source of direct operating potential having the positive terminal thereof connected to another terminal of said impedance element and the negative terminal thereof connected to another terminal of said series resistor, a biasing circuit for the grid of said tube including a resistor connecting the grid of said tube to the negative terminal of said source, means to apply voltages to be amplified to the control grid of said tube, an output circuit coupled to the anode of said tube, and a cathode follower circuit coupled across said first tube, said cathode follower circuit including a second tube having an anode, a control grid and a cathode, a direct connection between the anode of the first tube and control grid of the second tube, a further resistor connected between the cathodes of the tubes and a connection between the anode of the second tube and a positive terminal of said source, said further resistor being unbypassed and having a value less than the value of said series resistor multiplied by the gain factor of the first tube to render the output current of said amplifier circuit arrangement dependent primarily on input voltage and independent of operating potential variations for all frequencies of said voltages to be amplified up to the limit imposed by the natural frequency response of said tubes.

11. An oscillation generator, including a triode discharge system having cathode, grid and anode electrodes, a triode discharge structure having a cathode, a grid and an anode, the anode electrode of said triode discharge system being directly connected to the grid of said triode discharge structure, a tuned circuit connected to at least one electrode of said triode discharge system for producing resonance in the circuit connections of said triode discharge system, an adjustable resistor connected between the cathode electrode of said triode discharge structure and the cathode of said triode discharge system, a second resistor having one terminal thereof connected to the cathode of said triode discharge system, means to connect a source of direct potential to said circuit with the positive pole connected to the anode electrode of said triode discharge structure and the negative pole connected to the remaining terminal of said second resistor, and a potentiometer connected between the poles of said source connecting means and having a tap connected to the grid of said triode discharge system, and an output terminal connected to the anode electrode of said triode discharge system, the ratio of the resistance values of said adjustable resistor to said second resistor being less than the amplification factor of said triode discharge system.

12. An electron discharge circuit, including an electron discharge structure having a cathode, a grid and an anode, an electron discharge system having cathode, grid and anode electrodes, the anode of said electron discharge structure being directly connected to the grid electrode of said electron discharge system, an impedance element connected between the anode of said electron discharge structure and the anode electrode of said electron discharge system, a resistor connected between the cathode electrode of said electron discharge system and the cathode of said electron discharge structure, a second resistor having one terminal thereof connected to the cathode of said electron discharge structure, means to connect a source of direct potential to said circuit with the positive pole connected to the anode electrode of said electron discharge system and the negative pole connected to the remaining terminal of said second resistor, and resistive means connected between the grid of said electron discharge structure and the terminal of said second resistor to which said negative pole is connected, the ratio of the resistance values of the first said resistor to said second resistor being equal to or less than the amplification factor of said electron discharge structure, whereby the anode current of said electron discharge tube is primarily dependent on the grid voltage and substantially independent of variations in said source of direct potential.

13. An electron discharge circuit, including an electron discharge structure having a cathode, a grid and an anode, an electron discharge system having cathode, grid and anode electrodes, the anode of said electron discharge structure being directly connected to the grid electrode of said electron discharge system, an impedance element connected between the anode of said electron discharge structure and the anode electrode of said electron discharge system, a resistor connected between the cathode electrode of said electron discharge system and the cathode of said electron discharge structure, a second resistor having one terminal thereof connected to the cathode of said electron discharge structure, a source of direct potential having the positive pole thereof connected to the anode electrode of said electron discharge system and the negative pole connected to the remaining terminal of said second resistor, and a connection containing at least one resistor between the grid of said electron discharge structure and the terminal of said second resistor to which said negative pole is connected, the ratio of the resistance values of the first said resistor to said second resistor being less than the amplification factor of said electron discharge structure, whereby the anode current of said electron discharge tube is primarily dependent on the grid voltage and substantially independent of variations in said source of direct potential.

14. A direct current amplifying circuit, including an electron discharge structure having a cathode, a grid and an anode, an electron discharge system having cathode, grid and anode electrodes, the anode of said electron discharge structure being directly connected to the grid electrode of said electron discharge system, a resistance element connected between the anode of said electron discharge structure and the anode electrode of said electron discharge system, a resistor connected between the cathode electrode of said electron discharge system and the cathode of said electron discharge structure, a second resistor having one terminal thereof connected to the cathode of said electron discharge structure, means to connect a source of direct potential to said circuit with the positive pole connected to the anode electrode of said electron discharge system and the negative pole connected to the remaining terminal of said second resistor, an input circuit biasing element connected between the grid of said electron discharge structure and the terminal of said second resistor to which said negative pole is connected, the ratio of the resistance values of the first said resistor to said second resistor being equal to or slightly less than the amplification factor of said electron discharge structure, whereby the anode current of said electron discharge tube is primarily dependent on the grid potential and substantially independent of variations in said source of direct potential, means to apply direct currents to be amplified between the grid of said electron discharge structure and a point of fixed potential, and means to derive amplified output currents across the anode of said electron discharge structure and said point of fixed potential.

15. An electron discharge circuit, including an electron discharge structure having a cathode, a grid and an anode, an electron discharge system having cathode, grid and anode electrodes, the anode of said electron discharge structure being directly connected to the grid electrode of said electron discharge system, a load impedance element connected between the anode of said electron discharge structure and the anode electrode of said electron discharge system, a resistor connected between the cathode electrode of said electron discharge system and the cathode of said electron discharge structure, a second resistor having one terminal thereof connected to the cathode of said electron discharge structure, means to connect a source of direct potential to said circuit with the positive pole connected to the anode electrode of said electron discharge system and the negative pole connected to the remaining terminal of said second resistor, and means to bias the grid of said electron discharge structure with respect to the cathode thereof, the ratio of the resistance values of the first said resistor to said second resistor being equal to or less than the amplification factor of said electron discharge structure, whereby the anode current of said electron discharge tube is primarily dependent on the grid voltage and substantially independent of variations in said source of direct potential.

MAURICE ARTZT.

REFERENCES CITED

The following references are of record in the file of this patent:

UNITED STATES PATENTS

| Number | Name | Date |
|---|---|---|
| 1,990,216 | Asch | Feb. 5, 1935 |
| 2,050,059 | Koch | Aug. 4, 1936 |
| 2,155,210 | Young | Apr. 18, 1939 |
| 2,185,363 | White | Jan. 2, 1940 |
| 2,269,417 | Crosby | Jan. 6, 1942 |
| 2,271,197 | Keall | Jan. 27, 1942 |
| 2,321,269 | Artzt | June 8, 1943 |
| 2,354,930 | Stratton | Aug. 1, 1944 |
| 2,386,892 | Hadfield | Oct. 16, 1945 |
| 2,444,084 | Artzt | June 29, 1948 |